United States Patent [19]

Chester et al.

[11] Patent Number: 4,517,399

[45] Date of Patent: May 14, 1985

[54] PROCESS FOR THE PRODUCTION OF HIGH VISCOSITY INDEX LUBRICATING OILS FROM OLEFINS

[75] Inventors: Arthur W. Chester, Cherry Hill; William E. Garwood, Haddonfield, both of N.J.; Albert B. Schwartz, Philadelphia, Pa.

[73] Assignee: Mobil Oil Corporation, New York, N.Y.

[21] Appl. No.: 639,529

[22] Filed: Aug. 9, 1984

Related U.S. Application Data

[63] Continuation of Ser. No. 492,855, May 9, 1983, abandoned, which is a continuation-in-part of Ser. No. 359,964, Mar. 19, 1982, abandoned.

[51] Int. Cl.$^3$ ................................................. C07C 3/10
[52] U.S. Cl. ..................................... 585/533; 585/502
[58] Field of Search ............... 585/502, 520, 530, 531, 585/533

[56] References Cited

U.S. PATENT DOCUMENTS

| | | | |
|---|---|---|---|
| 4,081,490 | 3/1978 | Plank et al. | 585/407 |
| 4,100,262 | 7/1978 | Pelrine | 502/77 |
| 4,104,151 | 8/1978 | Rubin et al. | 585/640 |
| 4,105,541 | 8/1978 | Plank et al. | 585/415 |
| 4,176,050 | 9/1979 | Chen et al. | 502/77 |
| 4,227,992 | 10/1980 | Garwood et al. | 585/650 |
| 4,247,728 | 1/1981 | Rubin et al. | 585/481 |
| 4,375,458 | 3/1983 | Dwyer et al. | 423/329 |

*Primary Examiner*—Delbert E. Gantz
*Assistant Examiner*—A. Pal
*Attorney, Agent, or Firm*—M. G. Gilman; A. J. McKillop; J. F. Powers, Jr.

[57] ABSTRACT

An improved process for the production of high viscosity lubricating oils obtained by reacting olefins over ZSM-5 type zeolites at elevated temperatures and pressures in order to obtain a liquid product and thereafter recovering a lube oil fraction from said liquid product is disclosed. The improvement resides in the use of large crystal ZSM-5 which has been found to enhance the viscosity index of lubes produced from olefins.

11 Claims, No Drawings

PROCESS FOR THE PRODUCTION OF HIGH VISCOSITY INDEX LUBRICATING OILS FROM OLEFINS

CROSS REFERENCE TO RELATED APPLICATIONS

This application is a continuation of Ser. No. 492,855, filed May 9, 1983 which in turn is a continuation-in-part of Ser. No. 359,964 filed Mar. 19, 1982, now both abandoned.

BACKGROUND OF THE INVENTION

1. Field of the Invention

This invention is concerned with the manufacture of lubricating oils (lubes) and, in particular, with lubricating oils derived by the conversion of olefins over fresh ZSM-5 type zeolite. More particularly, this invention is directed towards the conversion of olefins over a ZSM-5 type zeolite catalyst characterized by large crystals to obtain a lubricating oil of low pour point and high V.I. (V.I. will be used herein to denote viscosity index).

2. Prior Art

The conversion of olefins over ZSM-5 type zeolites is extremely well known in the art and is the subject of many patents. Recently issued U.S. Pat. No. 4,227,992; as well as the patents mentioned therein are excellent examples of the prior art in connection with this general subject.

U.S. Pat. No. 4,126,644 discloses the conversion of a $C_5$-400° F. liquid fraction from a Fischer-Tropsch synthesis, predominantly $C_5$-$C_{10}$ olefins over zeolite ZSM-5 in order to produce higher boiling products, including a 650° F.+ lube fraction.

U.S. Pat. No. 3,322,848 is directed towards the manufacture of high V.I., low pour point lube oils from $C_{10}$-$C_{18}$ normal alpha olefins by processing over crystalline aluminosilicate zeolites other than those of the ZSM-5 type. CL BRIEF DESCRIPTION OF THE INVENTION It has now been found that the viscosity index of lubes produced from olefins, such as propylene, over fresh hydrogen ZSM-5 type zeolites varies with the crystal size of the zeolite. V.I. is the highest over a HZSM-5 which has a micron crystal size greater than 2 microns, intermediate over a 0.1-0.5 micron size and lowest over a 0.02-0.05 micron crystal size. Thus, the novel process of this invention resides in the conversion of olefins over an ZSM-5 type zeolites having large crystals, i.e. greater than 2 microns (hereinafter referred to as "macrocrystalline ZSM-5") and recovering from the liquid product via distillation a lube fraction which has an enhanced viscosity index.

Zeolites of the ZSM-5 type useful in the novel process of this invention include ZSM-5, ZSM-11, ZSM-12, ZSM-23, ZSM-35, ZSM-38 and ZSM-48.

DETAILED DESCRIPTION OF THE INVENTION

Macrocrystalline ZSM-5 type zeolites are known in the art to have, in fact, been used as catalysts in dewaxing operations as is disclosed and claimed in U.S. Pat. No. 4,176,050, the entire disclosure of which is herein incorporated by reference. Quite simply put, the novel process of this invention is directed towards using the same catalysts as is disclosed in U.S. Pat. No. 4,176,050 in order to produce lube oils by converting olefins, preferably $C_3$-$C_{18}$ olefins at elevated temperatures and pressures in order to obtain a liquid product, thereafter distilling the liquid product to obtain a lube oil fraction (i.e. one which generally boils above 600° F.) having an enhanced viscosity index. The novel process of this invention is carried out at temperatures ranging from about 350° F. to about 650° F. at pressures ranging from about 100 to about 5000 psig, and preferably from about 1000-2000 psig and at space velocities ranging from 0.1 to 10 WHSV and preferably from 0.2 to 2 WHSV.

The macrocrystalline ZSM-5 type catalyst utilized herein has a predominant crystal size of at least two microns, that is, at least about 50 weight percent of the crystals and preferably at least 70 weight percent of the crystals have a crystallite size in the range of 2-10 microns.

ZSM-5 itself is more particularly described in U.S. Pat. No. 3,702,886 to Arguaer et al, the entire contents of which are incorporated by reference. The macrocrystalline ZSM-5 utilized in this invention has essentially the same X-ray diffraction pattern as noted in said U.S. Pat. No. 3,702,886.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-21 is more particularly described in U.S. application Ser. No. 358,192, filed May 7, 1973, the entire contents of which are incorporated herein by reference, which application has been abandoned in favor of U.S. application Ser. Nos. 528,060 and 528,061, filed Nov. 29, 1974 directed to ZSM-38 and 35 respectively, the apparent component zeolites of ZSM-21, the entire contents of which are incorporated herein by reference. Ser. No. 528,061 has matured into U.S. Pat. No. 4,016,245. Ser. No. 528,060 has been abandoned in favor of Ser. No. 560,412 which has matured into U.S. Pat. No. 4,046,859.

ZSM-23 is described in U.S. Pat. No. 4,076,842, the disclosure of which is incorporated by reference.

ZSM-48 is disclosed and claimed in applications Ser. No. 303,276, filed Sept. 17, 1981, the disclosure of which is incorporated by reference.

The macrocrystalline ZSM-5 type zeolite used in the instant invention, preferably is at least partially in the hydrogen form. The original cations associated therewith may be replaced by a wide variety of other cations according to techniques well known in the art. Typical replacing cations will include hydrogen, ammonium, and metal cations, including mixtures of the same. Of the replacing metallic cations, particular preference is given to cations of metals such as rare earth metals, manganese, calcium, as well as metals of Group II of the Periodic Table.

Typical ion exchange techniques would be to contact a particular ZSM-5 zeolite with a salt of the desired replacing cation or cations. Although a wide variety of salts can be employed, particular preference is given to chlorides, nitrates, and sulfates.

Representative ion exchange techniques are disclosed in a wide variety of patents, including U.S. Pat. Nos. 3,140,249; 3,140,251; and 3,140,253.

The ZSM-5 zeolite is preferably admixed with an inorganic material which serves as a binder in order to provide desirable properties thereto, including improved crush resistance. The binders or matrices are extremely well known in the art and include various inorganic oxides, such as silica, alumina, magnesia, zirconia, thoria, or combinations thereof. The preferred matrix is alumina.

The following examples will now illustrate the novel process of this invention.

EXAMPLES 1-3

Examples 1-3 which will be described below were all made with a propylene charge at 1500 psig, 0.5 WHSV, charging the propylene as a liquid continuously with a positive displacement pump into a high pressure fixed bed unit. The catalysts were all 70:1 silica-to-alumina ratio HZSM-5 extruded with 35% alumina binder. The catalyst bed in each example was purged in situ with hydrogen at 900° F., atmospheric pressure for one hour to ensure a standard dry condition before introduction of said propylene.

EXAMPLE 1

>2 Micron HZSM-5

Propylene was charged over this large crystal size zeolite for a total of four days, the first two at 400° F. and the second two at 450° F. Liquid recovery was 93 wt. %. Distillation of the liquid product gave 10 wt. % lube fraction (based on propylene charge) boiling above ~600° F. having the following properties:

| Gravity, °API | 41.3 |
| --- | --- |
| Specific | 0.8189 |
| Pour Point | <−70 |
| K.V. @ 40° C., cs | 6.21 |
| K.V. @ 100° C., cs | 2.02 |
| V.I. | 122 |

EXAMPLE 2

0.1-0.5 Micron HZSM-5

Propylene was charged over this intermediate crystal size zeolite for a total of four days, the first two again at 400° F. and the second two at 450° F. Liquid recovery was 97 wt. %. Distillation of the liquid product gave 12 wt. % lube fraction (based on propylene charge) boiling above ~600° F. having the following properties:

| Gravity, °API | 40.3 |
| --- | --- |
| Specific | 0.8236 |
| Pour Point, °F. | <−70 |
| K.V. @ 40° C., cs | 10.19 |
| K.V. @ 100° C., cs | 2.66 |
| V.I. | 93 |

EXAMPLE 3

0.02-0.05 Micron HZSM-5

Propylene was charged over this small crystal size zeolite for a total of three days, the first two at 400° F. and the third at 450° F. Liquid recovery was 96 wt. %. Distillation of the liquid product gave 10 wt. % lube fraction (based on propylene charge) boiling above ~650° F. having the following properties:

| Gravity, °API | 33.3 |
| --- | --- |
| Specific | 0.8587 |
| Pour Point, °F. | −30 |
| K.V. @ 40° C., cs | 56.35 |
| K.V. @ 100° C., cs | 6.93 |
| V.I. | 70 |

As can be seen from the above examples, the viscosity index of the lube was the best with the macrocrystalline ZSM-5 of Example 1 and said viscosity index diminished as the crystallite size diminished.

EXAMPLE 4

This example was carried out using an alumina binder alone without any ZSM-5. Propylene was charged over the alumina binder alone for two days, the first at 400° F. and the second at 450° F. Liquid recovery was 7 wt. %, <1% (based on propylene charge) boiled above 600° F. This example shows that the binder used in making the ZSM-5 extrudates has essentially no activity for making lubes.

What is claimed is:

1. In a process for the production of lubricating oils from olefins wherein olefins are contacted over a ZSM-5 type zeolite at a temperature range of from 350° to 650° F., a pressure of from 1,000 to 5,000 psig and a space velocity from 0.1 to 10 WHSV in order to obtain a liquid product from which said lubricating oils boiling above about 600° F. are separated, the improvement which comprises utilizing said ZSM-5 type zeolite in a crystalline size greater than 2 microns.

2. The process of claim 1 wherein said ZSM-5 type zeolite is a fresh catalyst.

3. The process of claim 2 wherein at least 50% of the crystals are in the range of 2-10 microns.

4. The process of claim 3 wherein in at least 70 weight percent of the crystals have a crystallite size in the range of 2-10 microns.

5. The process of claim 3 wherein said ZSM-5 type zeolite is ZSM-5.

6. The process of claim 3 wherein said ZSM-5 type zeolite is ZSM-11.

7. The process of claim 3 wherein said ZSM-5 type zeolite is ZSM-12.

8. The process of claim 3 wherein said ZSM-5 type zeolite is ZSM-23.

9. The process of claim 3 wherein said ZSM-5 type zeolite is ZSM-35.

10. The process of claim 3 wherein said ZSM-5 type zeolite is ZSM-38.

11. The process of claim 3 wherein said ZSM-5 type zeolite is ZSM-48.

* * * * *